(12) United States Patent
Jacques et al.

(10) Patent No.: US 11,309,790 B2
(45) Date of Patent: Apr. 19, 2022

(54) POWER CONVERTER CIRCUIT

(71) Applicant: REDISEM LTD., Hong Kong (CN)

(72) Inventors: Russell Jacques, Hong Kong (CN); David Coulson, Hong Kong (CN)

(*) Notice: Subject to any disclaimer, the term of this patent is extended or adjusted under 35 U.S.C. 154(b) by 0 days.

(21) Appl. No.: 16/480,695

(22) PCT Filed: Jan. 26, 2017

(86) PCT No.: PCT/CN2017/072742
§ 371 (c)(1),
(2) Date: Jul. 25, 2019

(87) PCT Pub. No.: WO2018/137240
PCT Pub. Date: Aug. 2, 2018

(65) Prior Publication Data
US 2019/0386573 A1    Dec. 19, 2019

(51) Int. Cl.
*H02M 1/42*    (2007.01)
*H02M 7/25*    (2006.01)
(Continued)

(52) U.S. Cl.
CPC ....... *H02M 1/4258* (2013.01); *H02M 1/4208* (2013.01); *H02M 3/073* (2013.01); *H02M 3/33507* (2013.01); *H02M 3/33592* (2013.01); *H02M 7/12* (2013.01); *H05B 45/382* (2020.01); *H05B 45/39* (2020.01); *H05B 47/10* (2020.01); *H02M 1/0067* (2021.05); *H02M 1/4241* (2013.01); *H02M 7/25* (2013.01)

(58) Field of Classification Search
CPC ..... H02M 1/0067; H02M 7/25; H02M 1/4241

USPC .......................................... 363/60, 65, 67, 68
See application file for complete search history.

(56) References Cited

U.S. PATENT DOCUMENTS

| 5,223,767 | A | | 6/1993 | Kulka | |
|---|---|---|---|---|---|
| 5,959,410 | A | * | 9/1999 | Yamauchi | H05B 41/28 315/209 R |
| 6,034,489 | A | * | 3/2000 | Weng | H05B 41/28 315/307 |

(Continued)

FOREIGN PATENT DOCUMENTS

| CN | 1123968 A | 6/1996 |
|---|---|---|
| CN | 102907177 A | 1/2013 |

(Continued)

OTHER PUBLICATIONS

State Intellectual Property Office of the P.R. China (SIPO); International Search Report for International Patent Application PCT/CN2017/072742, dated Nov. 1, 2017, SIPO, Beijing, China.

(Continued)

*Primary Examiner* — Gary A Nash
(74) *Attorney, Agent, or Firm* — Nevin Carmichael Consulting

(57) ABSTRACT

A power converter circuit (1) and an associated method of converting an AC power supply. The power converter circuit (1) comprises: a supply rectifier circuit (2) for rectifying an AC supply power to generate a rectified supply power; an inverter circuit (3) for receiving the rectified supply power to generate an inverted supply power; a load rectifier circuit (4) for rectifying the inverted supply power to generate a rectified load power for supplying a load current to a load (5); and a charge pump circuit (6) driven by the load current to pump additional charge to the rectified supply power.

24 Claims, 10 Drawing Sheets

(51) Int. Cl.
*H02M 3/07* (2006.01)
*H02M 3/335* (2006.01)
*H02M 7/12* (2006.01)
*H05B 45/382* (2020.01)
*H05B 45/39* (2020.01)
*H05B 47/10* (2020.01)
*H02M 1/00* (2006.01)

(56) References Cited

U.S. PATENT DOCUMENTS

| | | | |
|---|---|---|---|
| 6,057,652 A * | 5/2000 | Chen | H05B 41/28 |
| | | | 315/219 |
| 6,642,670 B2 | 11/2003 | Zhang et al. | |
| 7,911,463 B2 | 3/2011 | Lin et al. | |
| 8,169,797 B2 | 5/2012 | Coccia et al. | |
| 8,736,189 B2 * | 5/2014 | Shackle | H05B 41/36 |
| | | | 315/247 |
| 2007/0217235 A1 * | 9/2007 | Quazi | H05B 41/28 |
| | | | 363/89 |
| 2014/0160805 A1 | 6/2014 | Oh et al. | |

FOREIGN PATENT DOCUMENTS

| | | |
|---|---|---|
| CN | 104348371 A | 2/2015 |
| CN | 105375807 A | 3/2016 |
| WO | 9204808 A | 3/1992 |
| WO | 03/001855 A | 1/2003 |
| WO | 2008152565 A | 12/2008 |
| WO | 2010054454 A | 5/2010 |
| WO | 2010143944 A | 12/2010 |
| WO | 2015143612 A | 10/2015 |
| WO | WO-2015143612 A1 * | 10/2015 ............. H05B 45/38 |

OTHER PUBLICATIONS

State Intellectual Property Office of the P.R. China (SIPO); Search Report Citation List for Chinese Patent Application CN201780088622.6, dated Dec. 25, 2020, SIPO, Beijing, China.

European Patent Office; Supplementary European Search Report Citation List for European Patent Application EP17893840, dated Aug. 18, 2020, EPO, Munich, Germany.

\* cited by examiner

[Fig. 3]
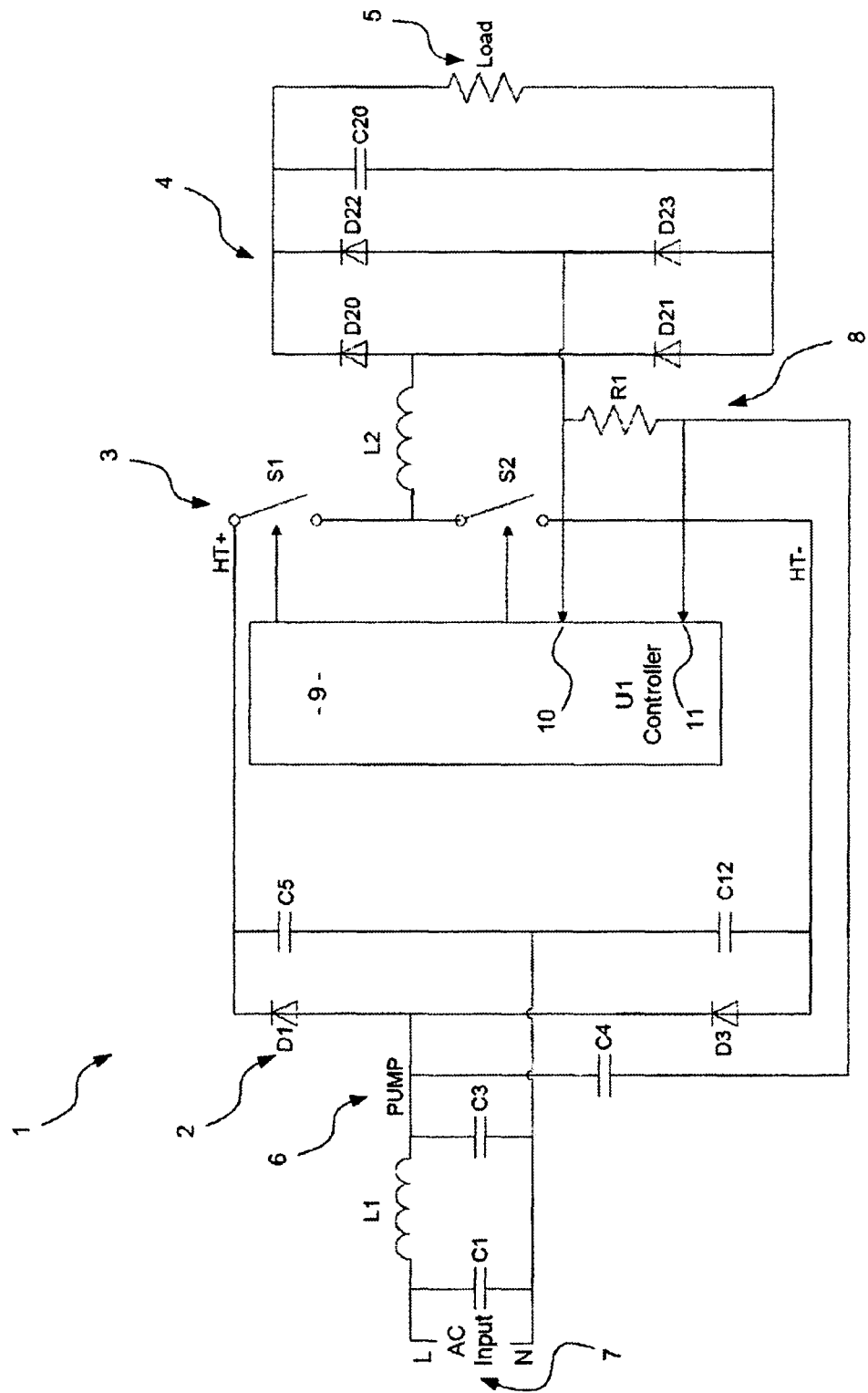

[Fig. 4]
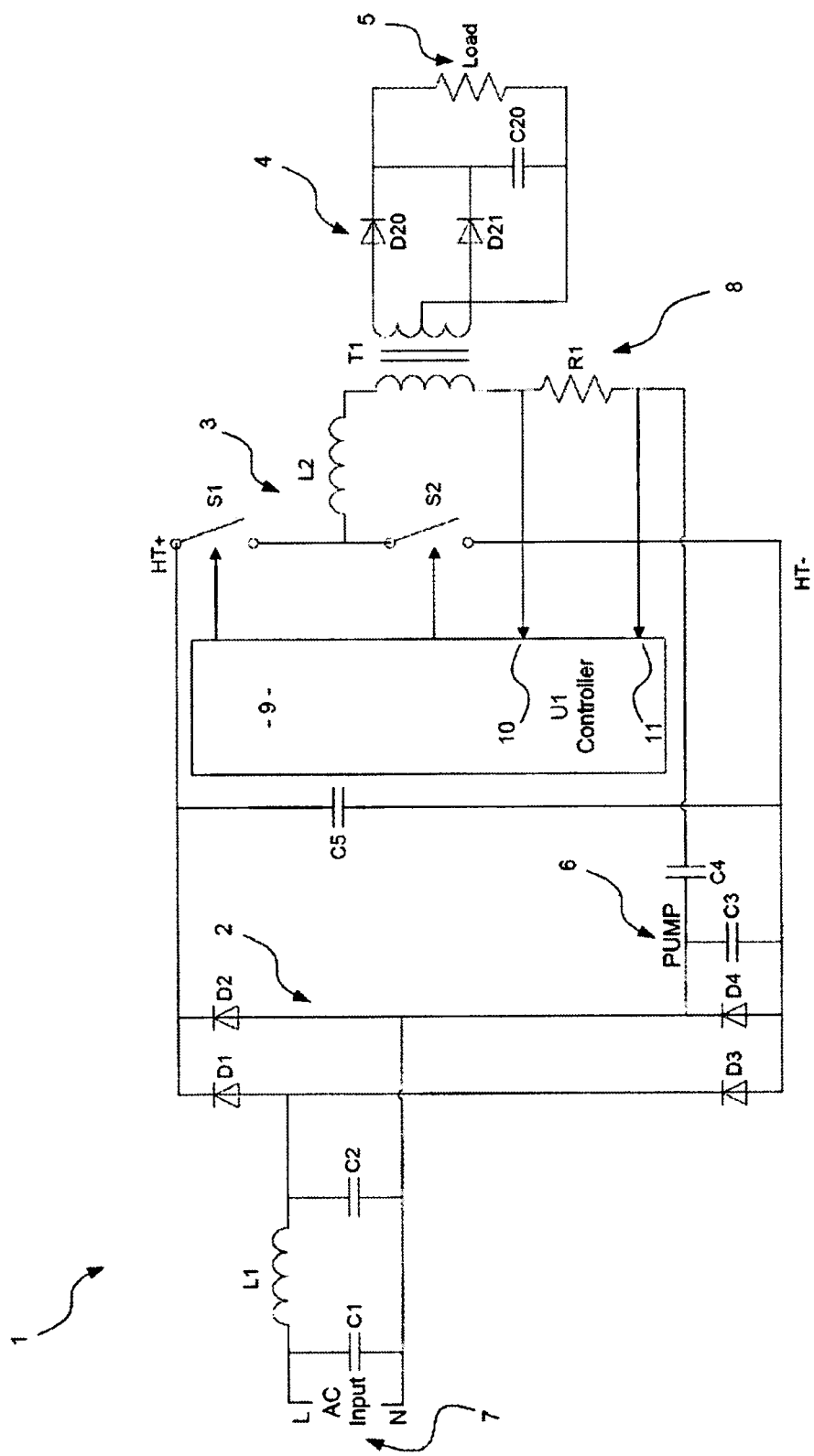

[Fig. 5]
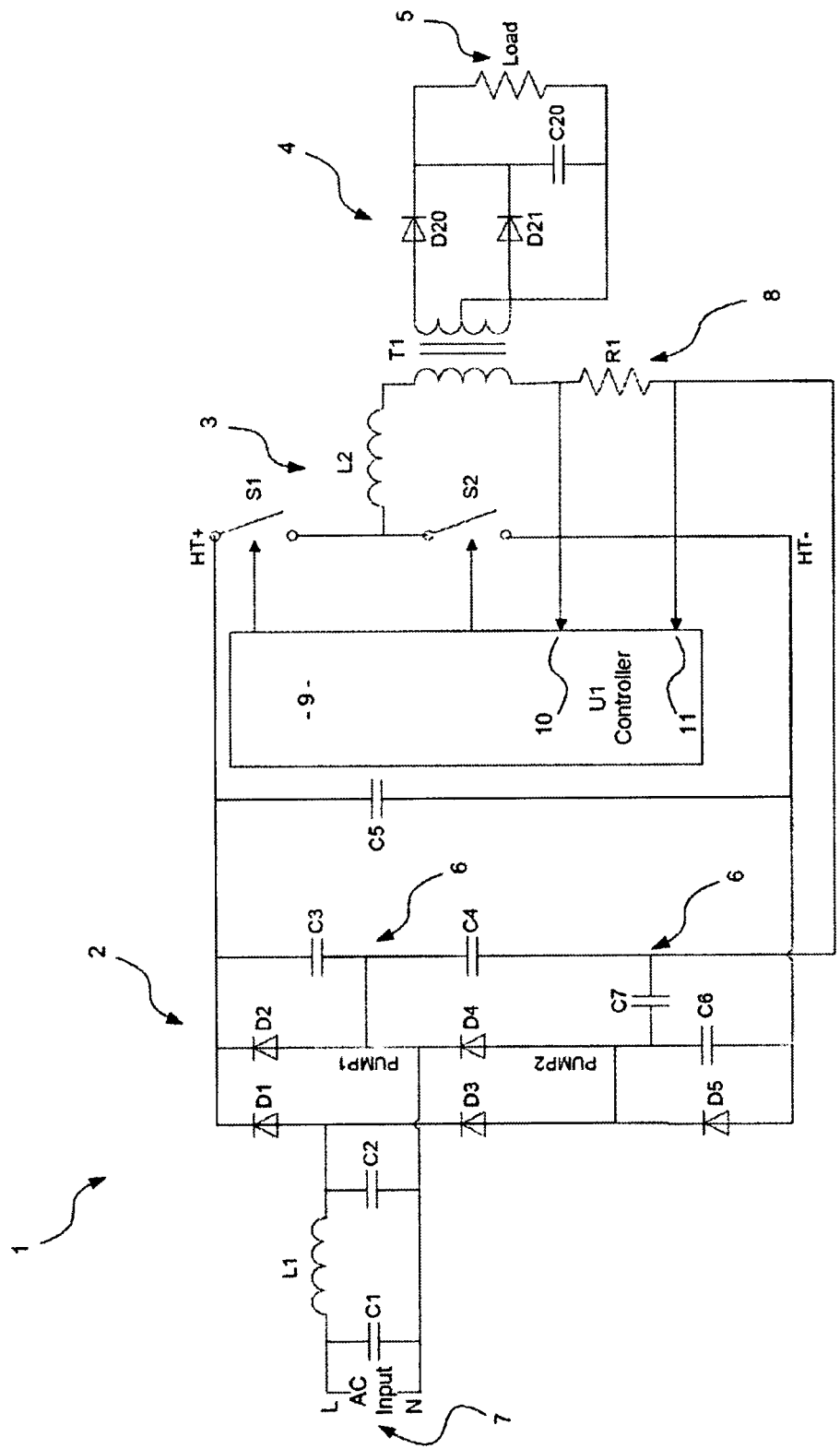

[Fig. 6]
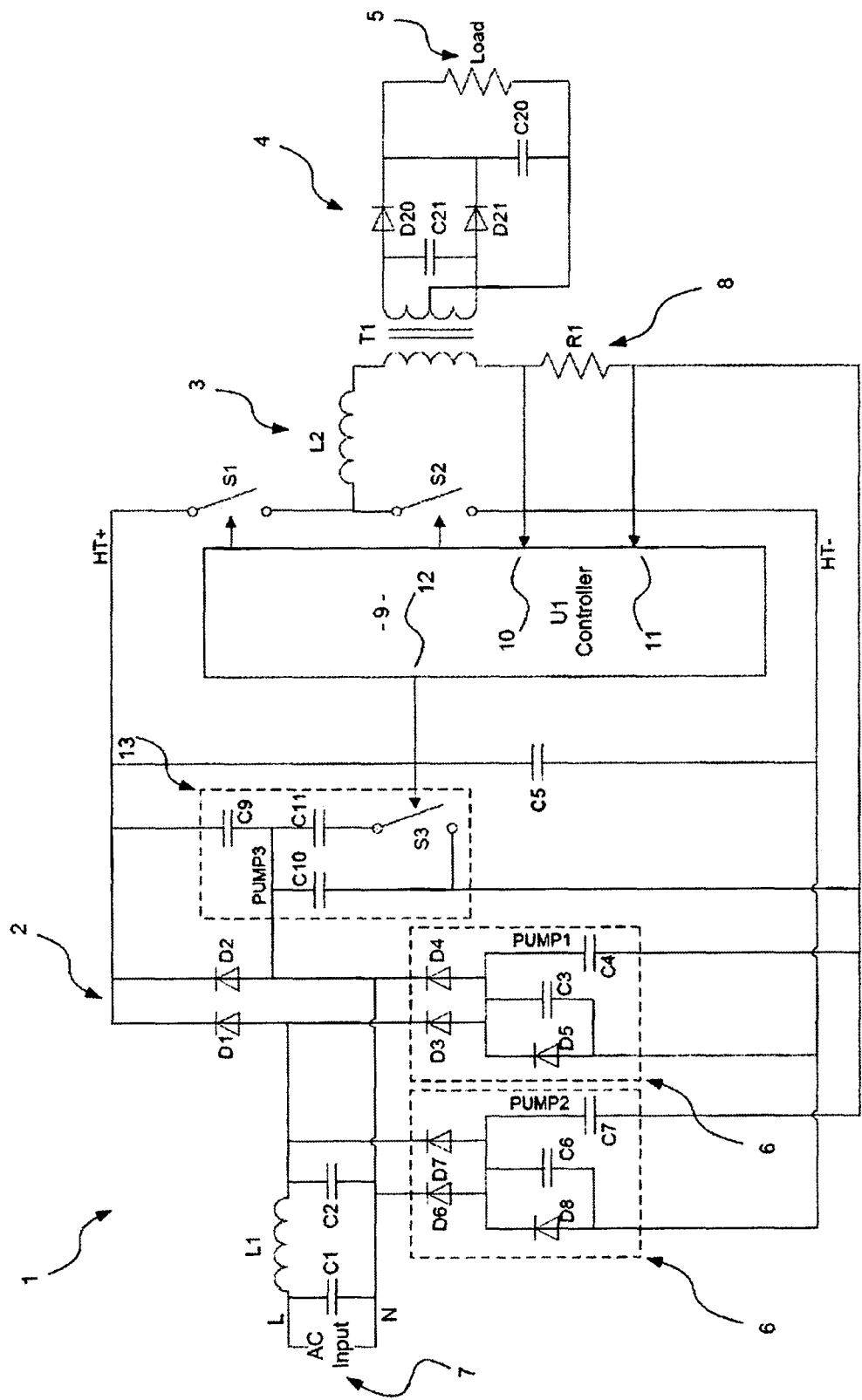

[Fig. 7]
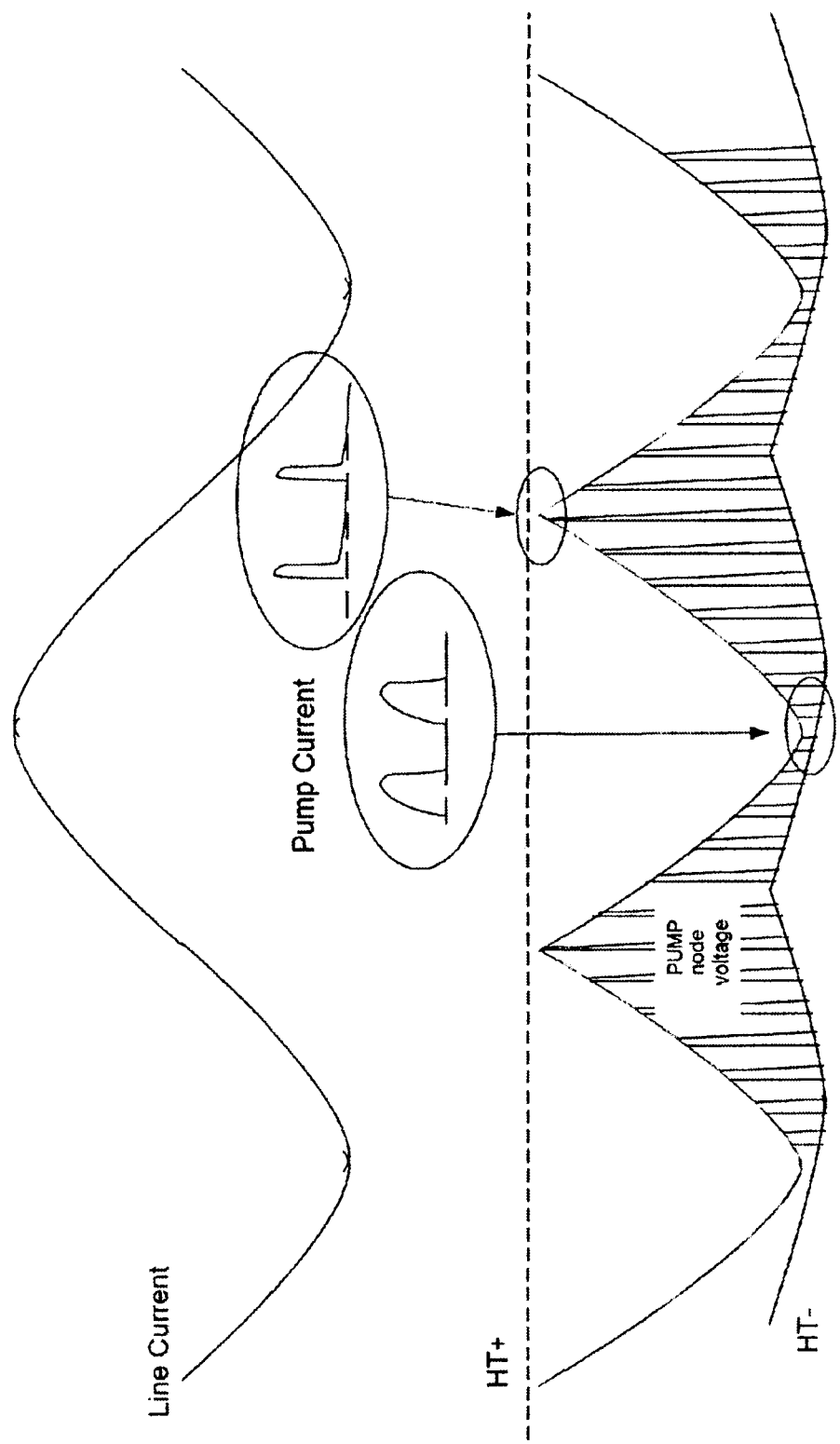

[Fig. 8]
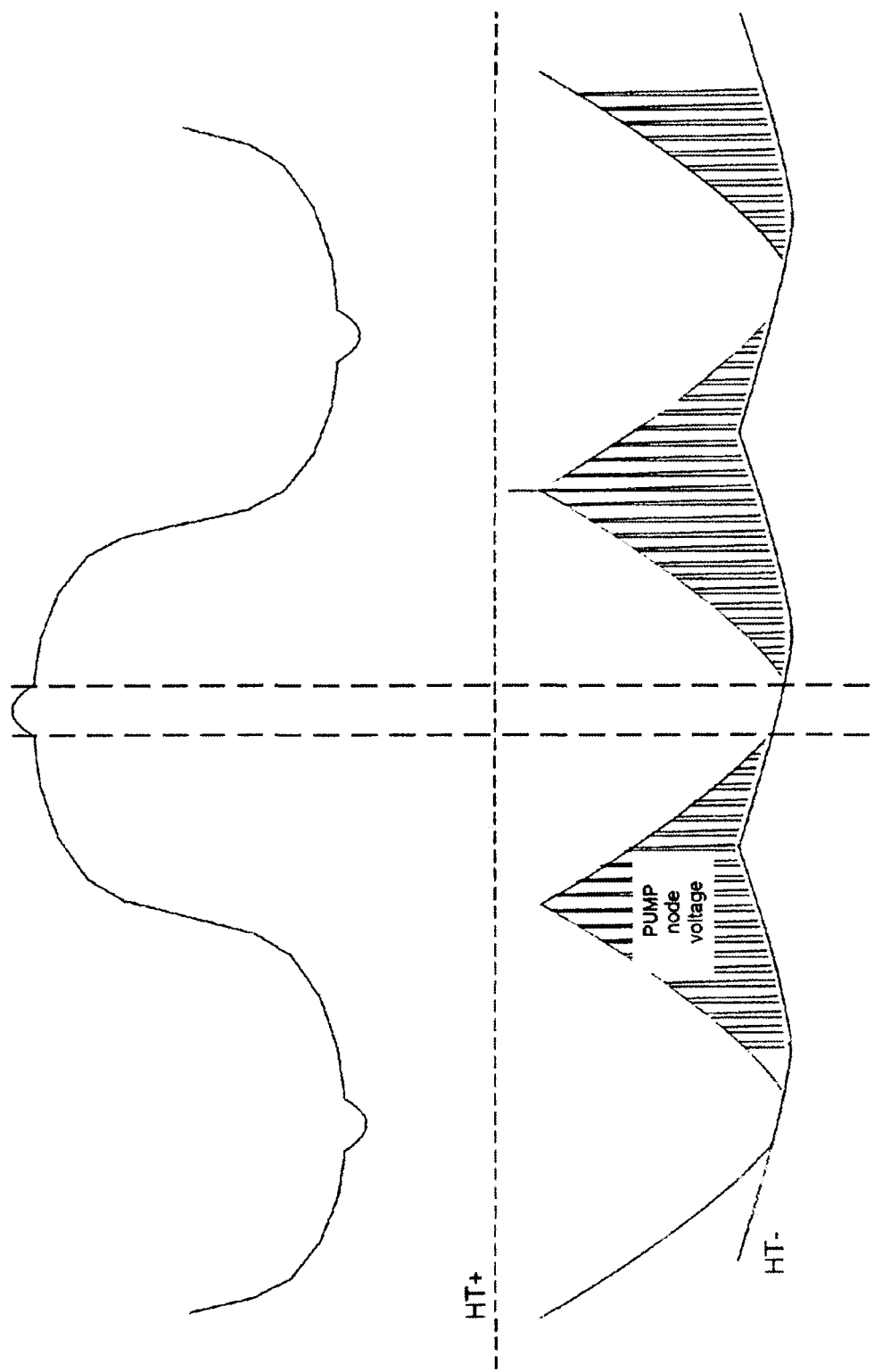

[Fig. 9]
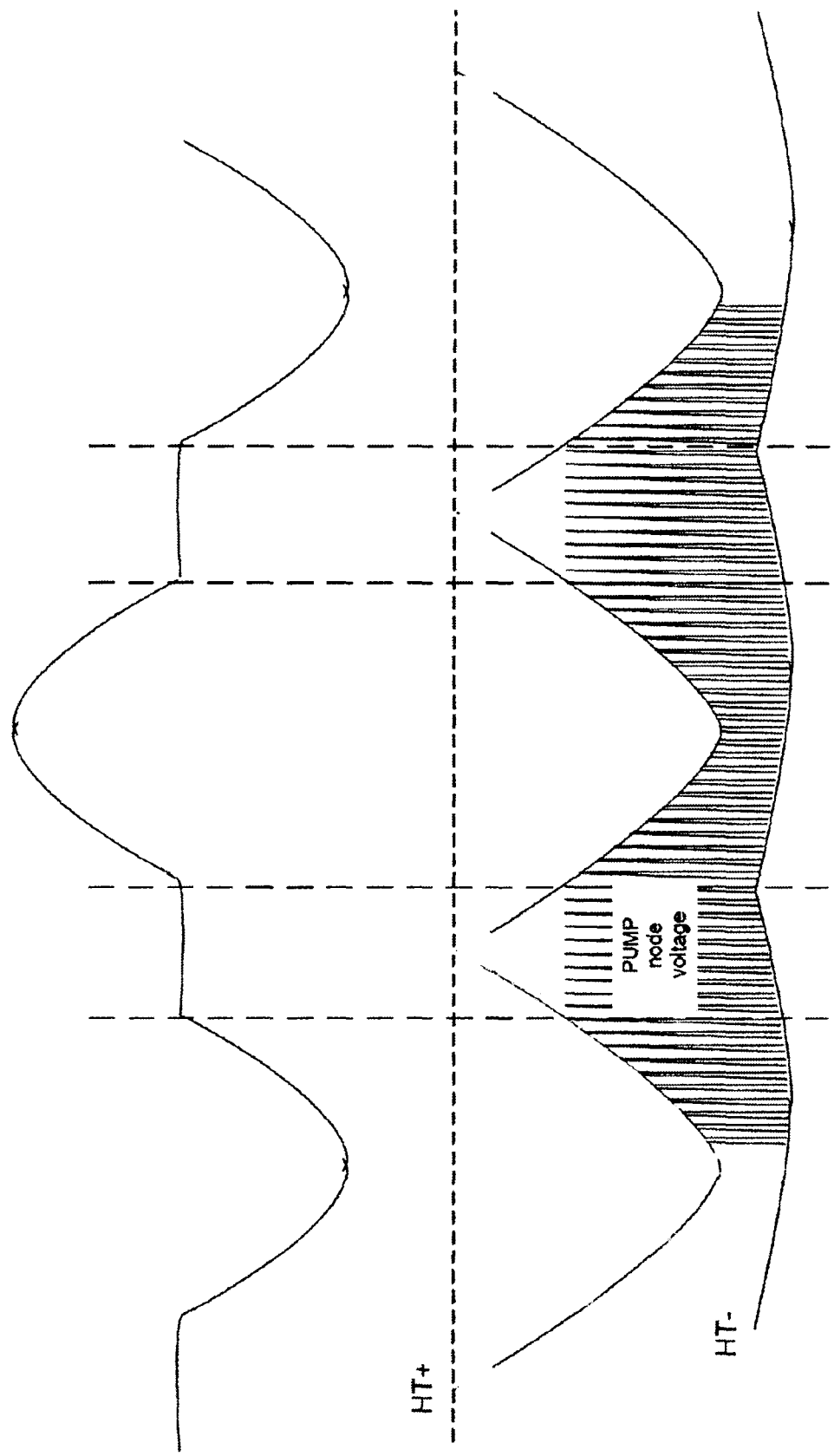

[Fig. 10]
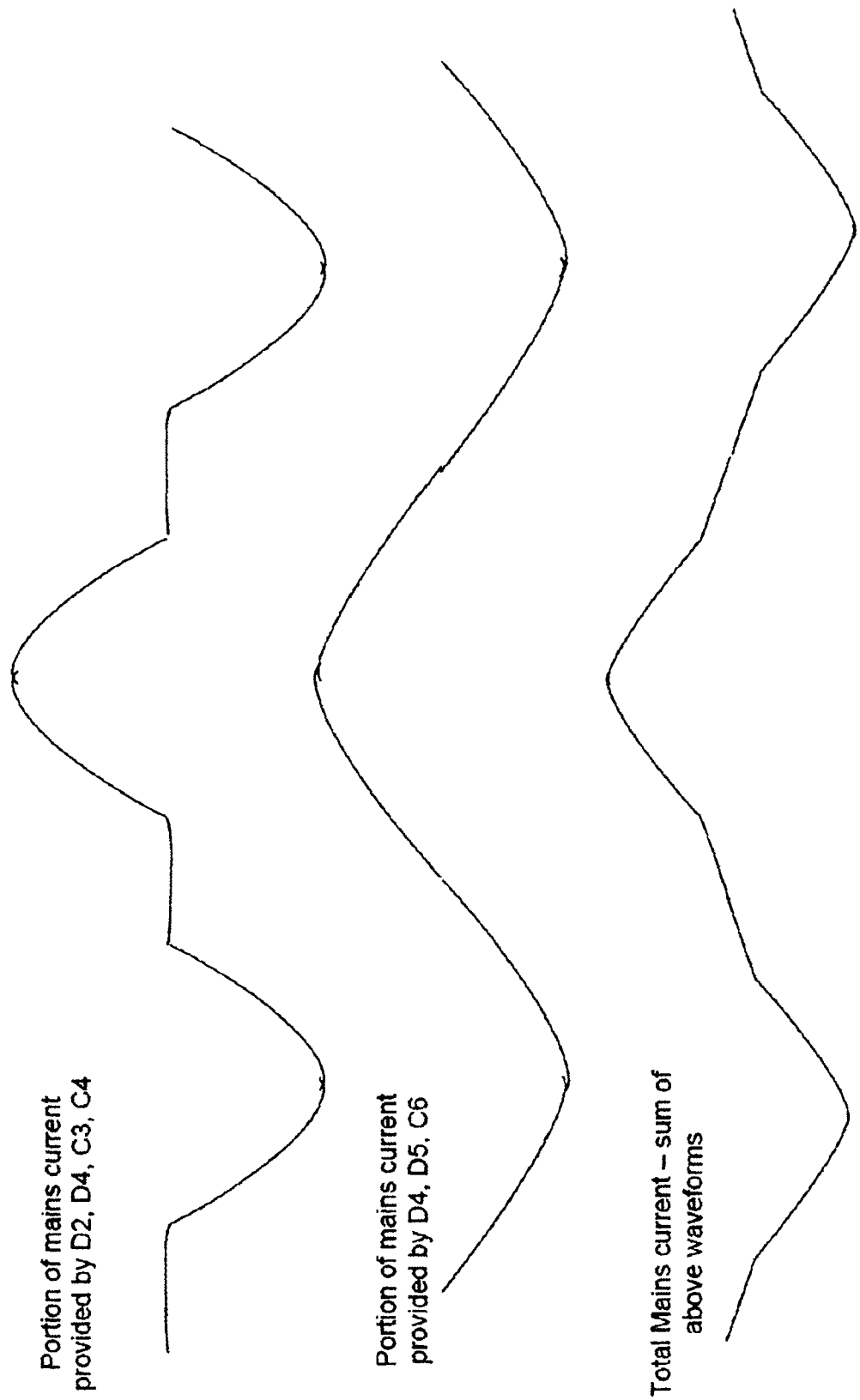

POWER CONVERTER CIRCUIT

TECHNICAL FIELD

The present invention relates to power converter circuits and methods of converting power, and in particular, circuits and methods of converting AC power to rectified DC power. The present invention is described herein primarily in relation to power converter circuits and methods of converting power suitable for use in power supplies and light emitting diode (LED) drivers, but is not limited to these particular uses.

BACKGROUND ART

Without some means of power factor correction any mains connected equipment which rectifies the incoming AC supply to produce a DC supply will be characterised by low power factor and high harmonic distortion which will generally exceed the permitted limits for mains-connected equipment. Power Supply Units (PSUs) and lighting ballasts which are designed for high efficiency, cost-sensitive consumer applications are often switched-mode types and are frequently based upon the half-bridge or full-bridge topology. These topologies are particularly suitable for higher power, high efficiency applications in which the ratio of input to output voltage is relatively confined. Regulations have been introduced in recent years to constrain the way that the input current is drawn from the AC supply, including the Power Factor (PF), Crest Factor (CF) and Total Harmonic Distortion (THD). The continuing pressure to conform to tighter regulations and reduce manufacturing costs forces the need for innovative methods in the design of switched-mode power supply controllers.

Various passively switched Power Factor Correction (PFC) circuits have been invented which use the switching power waveforms of the power converter to provide a measure of PFC to enable products to meet the statutory regulations at low cost with the disadvantage that the output current through the output load has a high ripple content. However, in many applications it is desirable that the current through the output load is substantially constant with low ripple. For example, in the case of LED lighting, a constant output current with low ripple provides advantages of high efficiency and long life as well as high quality light output without flicker.

Such prior circuits include those disclosed in U.S. Pat. Nos. 5,223,767A, 6,642,670B2, 7,911,463B2, US20090251065A1, WO2008152565A2, WO2010054454A2, WO2010143944A1, and WO9204808A1. Although these prior circuits achieve high PF with respect to the way that power is drawn from the mains supply, these circuits are generally not capable of delivering a current to the load which is both regulated and has low ripple. WO2015143612A1 discloses a circuit which may be capable of providing the required current regulation and low ripple, but this circuit requires a large number of components resulting in significant additional costs and manufacturing complexity.

It is an object of the present invention to overcome or ameliorate at least one of the disadvantages of the prior art, or to provide a useful alternative.

SUMMARY OF INVENTION

The present invention, in a first aspect, provides a power converter circuit comprising:
a supply rectifier circuit for rectifying an AC supply power to generate a rectified supply power;
an inverter circuit for receiving the rectified supply power to generate an inverted supply power;
a load rectifier circuit for rectifying the inverted supply power to generate a rectified load power for supplying a load current to a load; and
a charge pump circuit driven by the load current to pump additional charge to the rectified supply power.

A second aspect of the present invention provides a method of converting an AC supply power, the method comprising:
rectifying the AC supply power to generate a rectified supply power;
inverting the rectified supply power to generate an inverted supply power;
rectifying the inverted supply power to generate a rectified load power for supplying a load current to a load; and
using the load current to pump additional charge to the rectified supply power.

Further features of various embodiments of the present invention are defined in the appended claims. It will be appreciated that features may be combined in various combinations in various embodiments of the present invention.

Throughout this specification, including the claims, the words "comprise", "comprising", and other like terms are to be construed in an inclusive sense, that is, in the sense of "including, but not limited to", and not in an exclusive or exhaustive sense, unless explicitly stated otherwise or the context clearly requires otherwise.

BRIEF DESCRIPTION OF DRAWINGS

Preferred embodiments in accordance with the best mode of the present invention will now be described, by way of example only, with reference to the accompanying figures, in which:

FIG. 3 is a schematic diagram of a power converter circuit in accordance with an embodiment of the present invention;

FIG. 4 is a schematic diagram of a power converter circuit in accordance with another embodiment of the present invention;

FIG. 5 is a schematic diagram of a power converter circuit in accordance with yet another embodiment of the present invention;

FIG. 6 is a schematic diagram of a power converter circuit in accordance with a further embodiment of the present invention;

FIG. 7 shows typical waveforms for the power converter circuit shown in FIG. 4 or FIG. 5, when running optimally;

FIG. 8 shows typical waveforms for the power converter circuit shown in FIG. 4, when running sub-optimally, with low mains supply and/or high output LED voltage;

FIG. 9 shows typical waveforms for the power converter circuit shown in FIG. 4, when running sub-optimally, with high mains supply and/or low output LED voltage; and FIG. 10 shows the typical waveforms achieved by the first and second charge pump circuits for the power converter circuit shown in FIG. 5, showing the separate PFC contributions of the two charge pump circuits, when running sub-optimally, with high mains supply and/or low output LED voltage.

DESCRIPTION OF EMBODIMENTS

Figure 1:
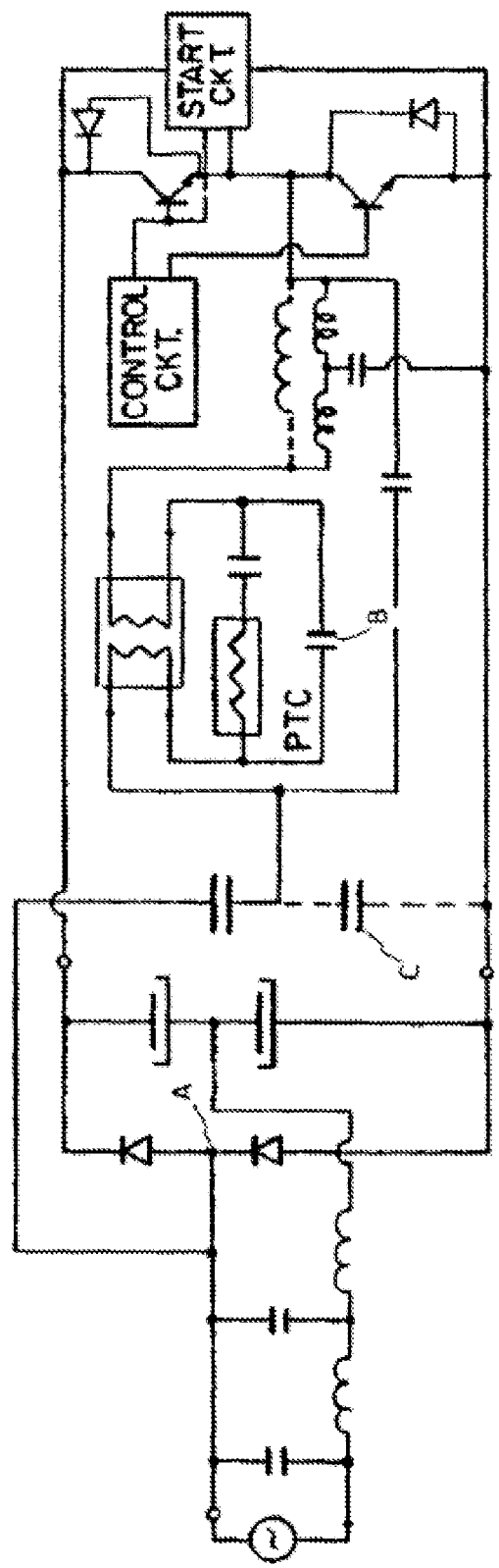
FIG. 1 is a schematic diagram of a prior art power converter circuit as disclosed in U.S. Pat. No. 6,642,670B2.

Referring to the figures, embodiments of the present invention provide a power converter circuit 1 comprising a supply rectifier circuit 2 for rectifying an AC supply power to generate a rectified supply power. The power converter circuit 1 further comprises an inverter circuit 3 for receiving the rectified supply power to generate an inverted supply power. The power converter circuit 1 also comprises a load rectifier circuit 4 for rectifying the inverted supply power to generate a rectified load power for supplying a load current to a load 5. A charge pump circuit 6 is driven by the load current to pump additional charge to the rectified supply power. The AC supply power can be provided by an AC power source 7 such as a mains power supply.

Typically, the waveforms of the rectified supply power have peaks and troughs. By using the charge pump circuit 6 to pump additional charge to the rectified supply power the resulting waveforms are smoother with smaller peaks and troughs. The resulting waveforms are the sum of the rectified supply power waveforms before additional charge is provided and the waveforms resulting from the additional charge. In the power converter circuit 1 described above, substantially all of the load current is used by the charge pump circuit 6 to provide the additional charge. Accordingly, the power converter circuit 1 achieves good Power Factor, low Total Harmonic Distortion, tight regulation of load current or voltage and low ripple in the load current or voltage.

The power converter circuit 1 also comprises a sensing circuit 8. An input of the sensing circuit 8 is connected to the load rectifier circuit 4 and an output of the sensing circuit 8 is connected with an input of the charge pump circuit 6. In the present embodiment, the sensing circuit 8 comprises a current-sensing device. This is suited for use with loads such as LEDs. In particular, the current-sensing device can take the form of a resistive component or resistor R1. In other embodiments, the sensing circuit 8 can comprise a voltage-sensing device. This is suited to applications where the power converter circuit is part of a power supply or power converter providing a voltage source for a load.

The power converter circuit 1 comprises a controller 9. The inverter circuit 3 has one or more switches and the controller controls the switches. In the embodiments shown in the figures, the inverter circuit 3 is a series-resonant half-bridge inverter with two switches S1 and S2. An input 10 of the controller 9 is connected to the load rectifier circuit 4. Another input 11 of the controller 9 is connected to an output of the sensing circuit 8.

In one embodiment, which is well suited for use with lower voltage mains supplies (e.g. 110 V) and which is best shown in FIG. 3, the charge pump circuit 6 comprises a first capacitor C4 connected between an input of the supply rectifier circuit 2 and an output of the sensing circuit 8. The supply rectifier circuit 2 of the embodiment shown in FIG. 3 is a half bridge rectifier circuit, and the charge pump circuit 6 comprises a second capacitor C3 connected across an input and an output of the supply rectifier circuit 2.

In another embodiment, as best shown in FIG. 4, the charge pump circuit 6 comprises a first capacitor C3 connected across a diode of the supply rectifier circuit 2. A second capacitor C4 is connected between the supply rectifier circuit 2 and an output of the sensing circuit 8.

Advantageously, in the embodiments shown in FIGS. 3 and 4, the charge pump circuit 6 only requires the first capacitor and the second capacitor (C3 and C4). This greatly reduces circuit complexity and costs.

In other embodiments, the power converter circuit 1 comprises two or more of said charge pump circuits 6. For example, FIG. 5 shows a power converter circuit 1 with two charge pump circuits 6. The first of these charge pump circuits 6 comprises a first capacitor C3 connected across a diode D2 of the supply rectifier circuit 2, and a second capacitor C4 connected between the supply rectifier circuit 2 and an output of the sensing circuit 8. The second charge pump circuit 6 comprises a charge pump diode D5 connected between the supply rectifier circuit 2 and the inverter circuit 3, a third capacitor C6 connected in parallel with the charge pump diode D5 and between the supply rectifier circuit 2 and the inverter circuit 3, and a fourth capacitor C7 connected between the supply rectifier circuit 2 and an output of the sensing circuit 8.

The first charge pump circuit 6, comprising C3 and C4, works by pumping charge from the AC supply input to a bulk capacitor C5. The second charge pump circuit 6, comprising C6, C7, and D5, works similarly by pumping charge to the bulk capacitor C5 from the AC supply input. In the two charge pump circuits 6, C6 is equivalent to C3, and C7 is equivalent to C4. Having more charge pump circuits 6 provides even more improved performance such as better Power Factor (PF), lower Total Harmonic Distortion (THD), tighter regulation of load current or voltage and lower ripple in the load current or voltage.

As shown above, the power converter circuit 1 can comprise one or more additional charge pump circuits 6, each said additional charge pump circuit comprising a charge pump diode and one or more additional capacitors, wherein the charge pump diode is connected to another diode. This other diode can be a diode of the supply rectifier circuit 2 or a charge pump diode of another additional charge pump circuit. In particularly advantageous embodiments, each additional charge pump circuit 6 only requires one charge pump diode and one or two charge pump capacitors. For example, the first charge pump circuit 6 of the embodiment of FIG. 5 only comprises two capacitors C3 and C4, and the second charge pump circuit 6 of the same embodiment only comprises two capacitors C6 and C7, and one charge pump diode D5. This greatly reduces circuit complexity and costs.

As best shown in FIG. 6, the power converter circuit 1 can comprise one or more switched charge pump circuits 13. Each such switched charge pump circuit 13 comprises a charge pump capacitor C10 connected between the supply rectifier circuit 2 and an output of the sensing circuit 8, and a charge pump switch S3 connected in parallel with the charge pump capacitor C10. The charge pump switch S3 forms part of a series combination with another charge pump capacitor C11, the combination being connected in parallel with the charge pump capacitor C10. A state of the charge pump switch S3 is responsive to a sensed circuit parameter. The sensed circuit parameter can be a DC bulk supply voltage. Typically, the controller 9 has an output 12 connected to the charge pump switch S3 to control the charge pump switch S3 based on the sensed circuit parameter.

As noted above, the power converter circuit 1 comprises a bulk capacitor C5. This can be connected across the inverter circuit 3. As shown in FIG. 3, there can also be two bulk capacitors C5 and C12 connected across the inverter circuit 3.

The power converter circuit 1 comprises a first supply line L and a second supply line N to receive the AC supply power from the AC power source 7. The first supply line L is connected to a first input of the supply rectifier circuit 2 and the second supply line N connected to a second input of the supply rectifier circuit 2. A supply capacitor C1 is connected across the first and second supply lines, and thereby across the AC power source 7. For EMI reduction, a supply inductor L1 can be connected in series with the first supply line L between the supply capacitor C1 and the first input of the supply rectifier circuit 2. A second supply capacitor C2 can also be connected across the first and second supply lines, and thereby across the AC power source 7, and between the supply inductor L1 and the supply rectifier circuit 2.

As shown above, the supply rectifier circuit 2 can be in the form of a half bridge rectifier circuit, as shown in FIG. 3 with diodes D1 and D3, or in the form of a full bridge rectifier circuit, as shown in FIGS. 4, 5, and 6 with diodes D1, D2, D3, and D4.

The inverter circuit 3 comprises two switches S1 and S2 connected in series. The inverter circuit 3 further comprises an inverter inductor L2 having an inverter inductor input connected between the two switches.

In one embodiment, as best shown in FIG. 3, the inverter inductor L2 has an inverter inductor output connected to the load rectifier circuit 4. The load rectifier circuit in this embodiment comprises a full bridge rectifier with four diodes D20, D21, D22, and D23.

In other embodiments, as best shown in FIGS. 4, 5, and 6, the inverter inductor L2 has an inverter inductor output connected to a first side of a transformer T1, and the load rectifier circuit 4 is connected to a second side of the transformer T1. In this way, the load is isolated from the AC power source 7. The load rectifier circuit 4 in these embodiments comprises two diodes D20 and D21.

It is appreciated by those skilled in the art that there are different variations of the circuit within the scope of the present invention. The circuit components shown in the embodiments can be placed in different arrangements or order, but still fall within the scope of the present invention and provide the functionality described in respect of the circuit as originally arranged or ordered in the described embodiments. For example, in the embodiments shown in FIGS. 4, 5, and 6, the inverter inductor L2, the transformer T1, and the resistor R1 are connected in series. It is appreciated by those skilled in the art that these components can be interchanged freely whilst still providing the same functionality as the components provided before being interchanged, and therefore, still falling within the scope of the present invention.

Thus, some preferred embodiments of the present invention generally provide a power converter circuit with a series-resonant half bridge inverter, one or more passive charge pump circuits and a controller which corrects the PF and minimises the harmonic distortion of the input current.

The resonant tank is made up of an inductor and the series combination of the capacitors in the passive charge pump circuits. The Q factor of the resonant tank determines in part the switching frequency variation that must be utilised by the controller to achieve the necessary levels of PF and harmonic distortion across the required ranges of the AC supply power, such as mains supply input, and the output load.

In one embodiment, the passive charge pump circuit is made up of two diodes and at least one capacitor. A high proportion, if not substantially all, of the current flowing through the resonant tank of the series-resonant inverter is coupled through the capacitor into the passive charge pump circuit wherein the current flows through one of the two diodes, depending on the polarity of the current at any moment in time. During one half-cycle of the inverter one diode conducts so that energy is delivered from the mains supply to the said resonant tank. During the second half-cycle the other diode conducts so that energy is delivered from the resonant tank to the bulk capacitor. An optional second capacitor may be used to modify the conduction times of the two diodes thereby making the charge pumping action dependent on the frequency and the potential difference across the two diodes.

A supply filter comprising reactive components (L1, C1, and C2) is coupled between the mains terminals (L, N) and the bridge supply rectifier circuit 2 to suppress unwanted emissions relating to the inverter switching frequency.

In a preferred topology of the invention the half-bridge circuit drives a series-connected combination of the resonant inductor, the output load and the passive charge pump circuit. In this way, the controller can regulate the output current accurately by sensing and regulating the current through the resonant tank. Therefore, there is no need for remote sensing using such devices as optocouplers, which is a particular advantage when driving isolated loads. Additionally there is no need for an additional resonant current loop to provide the charge pumping function because the load current itself drives the passive charge pump circuit thereby achieving the advantages of the present invention with minimal power wastage and complexity.

For example, for typical LED lighting applications, with a single line input and an output voltage range varying up to 30% from nominal, the present invention can achieve PF>0.95 and compliant harmonic emissions with THD<20% with only a single passive charge pump circuit. In this case, the burden of adding PF correction and low harmonic emissions is simply the cost of two inexpensive passive components (C3 and C4).

The present invention can also employ a plurality of passive charge pump circuits operating in conjunction to achieve good PF and low harmonic distortion across a wider range of input and output voltages than may be achieved with the single passive charge pumping stage. Comparing the embodiments shown in FIGS. 4 and 5 respectively, a second charge pumping stage is provided by the addition of only two capacitors and one diode (C6, C7, and D5). For example, a typical constant current LED lighting application required to operate with dual line input (220V/240V) and an output voltage range of 50-100%, can achieve PF>0.95 and compliant harmonic emissions with THD<20% if two passive charge pumping stages are employed. Further charge pumping stages may be added in the same way to achieve even better PF and harmonic emissions.

Considering the figures more specifically, FIG. 1 shows a half bridge ballast for fluorescent lamps which employs passive power factor correction to achieve good PF and harmonic emissions. FIG. 3 shows an embodiment of a half bridge converter according to the present invention. Comparing the circuits shown in FIG. 1 and FIG. 3, it can be seen that the current flowing into the charge pump of the first converter is significantly different to the current in the second. In FIG. 1, the current flowing into the charge pump A is the sum of the lamp current plus the current in the parallel resonant capacitor B modified by the presence of shunt capacitor C. In FIG. 3, the current flowing into the charge pump is substantially the load current, being taken from the load current sensor 8. In this way, the controller 9 in FIG. 3 can achieve accurate simultaneous regulation of both load current and charge pump current, thereby optimizing the PF and harmonic emissions.

Figure 2:
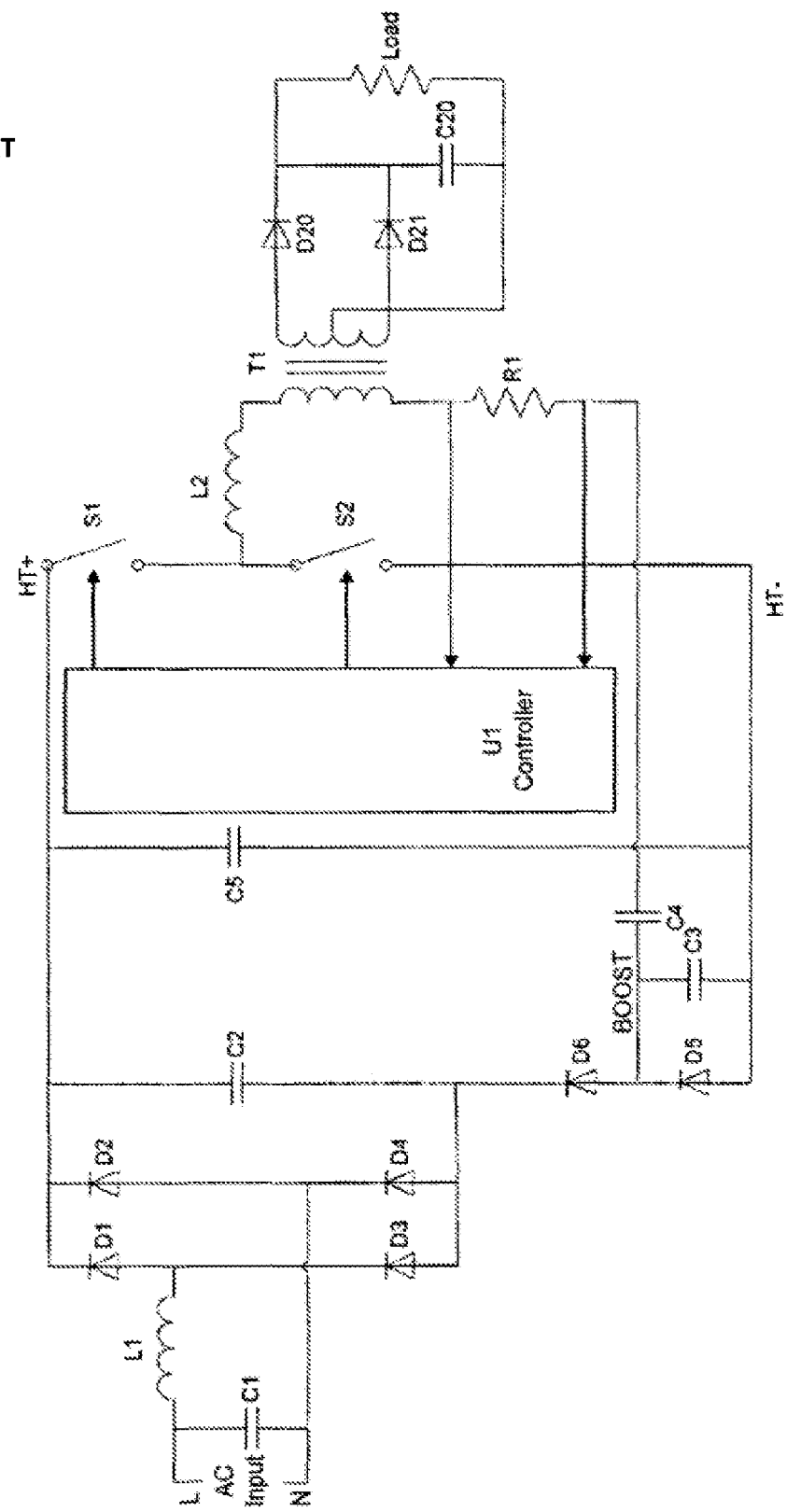
FIG. 2 is a schematic diagram of a prior art power converter circuit as disclosed in WO2015143612A1.

FIG. 2 shows a typical isolating half bridge driver circuit according to WO2015143612A1 while FIG. 4 shows an embodiment of the present invention. Both circuits have a single charge pump stage but the present invention achieves similar performance with one less component, D5. This greatly reduces manufacturing effort, time, and cost, especially when these circuits are mass-produced. Having fewer components, even one less component, also reduces circuit complexity which increases the robustness and reliability of the circuit.

Referring to FIG. 4, a mains voltage source (L, N) is connected to a low-pass input filter comprising C1, L1, C2. Typically, the low-pass input frequency bandwidth would be below the switching frequency of the power converter, but above the mains voltage supply frequency. The output of the filter is connected to the input of the full-wave rectifier bridge (D1, D2, D3, and D4). Capacitors C3, C4 are connected to the junction of D2, D4 to form a passive charge pump circuit that pumps current from the input filter circuit through D2 and D4 to the positive terminal of the DC bulk capacitor C5. A controller 9 (U1) drives the half-bridge switches S1 and S2 alternately to produce an alternating voltage at a first connection of a resonant inductor L2 with the second connection being coupled to a first primary connection of an isolating transformer T1. A second primary connection of T1 is connected to a first connection of a current-sensing device R1 with a second connection being connected to a first connection of charge pump circuit 6 comprising C3 and C4. A second connection of the charge pump circuit 6 (comprising C3 and C4) is connected to one output connection of the bridge rectifier 2 (D1, D2, D3, D4) and a third connection of the charge pump circuit 6 (C3 and C4) being connected to the second output connection of the bridge rectifier 2 (D1, D2, D3, D4). The first and second secondary connections of the isolating transformer T1 are connected to first and second inputs of the output rectifier 4, comprising D20 and D21. The output of the output rectifier 4 is connected to a first connection of the load 5 with the second connection being connected to a third secondary connection of the isolating transformer T1.

It can be seen that the current through the current sensor 8 is the load current, transformed by transformer T1 and rectified by output diodes D20 and D21, so it is practical to achieve highly accurate DC current with very low ripple.

FIG. 5 shows a possible extension of the present invention where the application requirement is for a wider voltage range on the mains input or the voltage or current of the output load. Here, the limitations of the power converter circuit of FIG. 4 can be eased by adding a second charge pump circuit 6 comprising capacitors C6 and C7, and diode D5. The second charge pump circuit 6 would advantageously use different capacitor values to those in the first charge pump circuit 6 and would therefore operate with different characteristics to the first charge pump stage 6.

FIG. 7 shows the current and voltage waveforms when the circuit of FIG. 4 is working optimally. The same current that passes through the load also flows through the passive charge pump circuit 6 (formed by C3 and C4, in conjunction with D2 and D4), which produces a voltage on the bulk capacitor C5. Here, the voltage developed across the charge pump capacitor C3 is large enough to force the diodes D2 and D4 to conduct for part of each switching cycle, throughout the entire cycle of the line supply waveform. When the line voltage is close to the zero-crossing, the conduction through D2 and D4 is almost, but not quite cut off, so that the current drawn from the supply is at a minimum. Consequently, the charge pumping at this point is almost non-existent. However, around the peak of the line voltage, the conduction of D2 and D4 is at a maximum, approximately 50%, thus maximising the current drawn from the line supply.

FIG. 8 shows the current and voltage waveforms that occur if the input voltage to the circuit of FIG. 4 is decreased (assuming that the controller maintains the output voltage and current at substantially the same levels). The reduced input voltage results in a lower average voltage and increased ripple across the DC bulk capacitor C5. The control circuit decreases the switching frequency to maintain the load current regulation, increasing the current passed through the diodes D2 and D4, which partly compensates the bulk supply voltage. However, the lower bulk supply voltage and increased ripple means that the bulk voltage falls below the rectified mains voltage when the mains voltage is at the peak. At this point, one arm of the bridge rectifier 2 (either D1 with D3, or D2 with D4) turns mostly on, superimposing a sharp pulse on to the current waveform. The mains current waveform is now rich in harmonics, making it less likely to comply with the statutory requirements of the harmonics emissions standards.

FIG. 9 shows the converse set of voltage and current waveforms that occur if the input voltage is increased (again assuming that the controller maintains the output voltage and current at substantially the same levels). As in the previous case, the distorted line current waveform is rich in harmonics, making it less likely to comply with harmonics emissions standards.

It is possible to improve the poor current waveform of FIG. 9 by decreasing the value of C3, so that the HT voltage is increased more, but this would force an increase in the voltage rating of the HT capacitor C5, increasing the cost. A better alternative is shown in FIG. 10 where the distorted current waveform of FIG. 9 can be improved by adding a second charge pump circuit (C6, C7, and D5) to the converter circuit, as shown in FIG. 5. In this way, using two or more passive charge pump circuits can improve the PF and reduce harmonic distortion under these conditions.

FIG. 6 shows a further extension of the present invention where the application requirement is for an even wider voltage range on the mains input or output load. In this case, one or more charge pump stages may be added which include one or more active switches connected in series with one or more of the charge pump capacitors to allow the controller 9 to modify the charge pumping characteristics. Referring to FIG. 6, a switched charge pump circuit 13 comprises capacitors C9, C10, and C11, and switch S3 which operate in conjunction with diodes D2 and D4 of the supply rectifier circuit 2. A first connection of the switched charge pump circuit 13 is connected to the return terminal of the current sensor 8, with a second connection being connected to an input of the supply rectifier 2, a third connection being connected to the DC bulk supply capacitor C5 and an input connection of switch S3 being connected to the controller 9. The switch S3 is controlled by a signal from an output connection 12 of the controller 9, in response to a circuit parameter such as the DC bulk supply voltage, the input voltage, the output voltage, the load current, the switching frequency or some combination thereof. The amount of additional charge being pumped is determined by the switch position of S3 and the values of C9, C10, and C11, there being more charge when the switch S3 is open. Advantageously, the switch S3 would be closed when the controller 9 detects that the bulk supply voltage has exceeded a predetermined value, thereby protecting the bulk supply capacitor C5 from excessive voltage stress. Alternatively, the switch S3 could be switched synchronously with the inverter circuit 3 with a duty cycle which is responsive to the sensed circuit parameter. Optionally, capacitors may be added or omitted into the switched charge pump circuit 13 to modify the charge pumping characteristics as required. Furthermore, switches may be inserted in series with any of the capacitors, depending on the switched charge pumping characteristics required.

The present invention, in another aspect, also provides a method of converting an AC supply power. In a preferred embodiment, the method comprises rectifying the AC supply power to generate a rectified supply power, inverting the rectified supply power to generate an inverted supply power, rectifying the inverted supply power to generate a rectified load power for supplying a load current to a load, and using the load current to pump additional charge to the rectified supply power.

Other features of preferred embodiments of this method have been described above or are readily apparent from the above description.

The present invention achieves good Power Factor, low Total Harmonic Distortion, tight regulation of load current or voltage and low ripple in the load current or voltage. Furthermore, since only passive components are used, these advantages are provided at minimum cost.

Generally, the present invention provides power converter circuits and methods for converting power to supply a regulated or substantially constant DC current or voltage to a load using a passive charge pumping technique to achieve an input current with high power factor, an output current or voltage with low ripple, and low harmonic distortion. More specifically, the present invention is suitable for use in power supplies such as Switched-Mode Power Converters (SMPC), including Switched Mode Power Supplies (SMPS), Inverters, Lighting Ballasts, and flicker-free Light-Emitting Diode (LED) drivers. In particular, the present invention advantageously provides apparatus and methods for controlling the power factors of AC-DC Power Converters. The present invention is particularly suited for use in resonant-mode Switched-Mode Power Converters.

It can be appreciated that the aforesaid embodiments are only exemplary embodiments adopted to describe the principles of the present invention, and the present invention is not merely limited thereto. Various variants and modifications may be made by those of ordinary skill in the art without departing from the spirit and essence of the present invention, and these variants and modifications are also covered within the scope of the present invention. Accordingly, although the invention has been described with reference to specific examples, it can be appreciated by those skilled in the art that the invention can be embodied in many other forms. It can also be appreciated by those skilled in the art that the features of the various examples described can be combined in other combinations. In particular, there are many possible permutations of the circuit arrangements described above which use the same passive method to achieve passive power factor correction, and which will be obvious to those skilled in the art.

The invention claimed is:

1. A power converter circuit comprising:
a supply rectifier circuit for rectifying an AC supply power to generate a rectified supply power;
an inverter circuit for receiving the rectified supply power to generate an inverted supply power;
a load rectifier circuit for rectifying the inverted supply power to generate a rectified load power for supplying a load current to a load; and
a charge pump circuit driven by the load current to pump additional charge to the rectified supply power, the charge pump circuit comprising a first capacitor connected between the supply rectifier circuit and either the load rectifier circuit or an output of the inverter circuit.

2. A power converter circuit according to claim 1 comprising a sensing circuit connected between the supply rectifier circuit and either the load rectifier circuit or the output of the inverter circuit.

3. A power converter circuit according to claim 2 wherein the sensing circuit comprises a current-sensing device or a voltage-sensing device.

4. A power converter circuit according to claim 2 comprising a controller, wherein the inverter circuit has one or more switches and the controller controls the switches.

5. A power converter circuit according to claim 4 wherein an input of the controller is connected to either the load rectifier circuit or the output of the inverter circuit.

6. A power converter circuit according to claim 4 wherein an input of the controller is connected to an output of the sensing circuit.

7. A power converter circuit according to claim 4 wherein the controller controls the switches to increase power factor and to reduce harmonic distortion of the AC supply power, or the controller controls the switches to provide regulation of load current or voltage with a low ripple.

8. A power converter circuit according to claim 1 wherein the charge pump circuit comprises a second capacitor connected across an input and an output of the supply rectifier circuit.

9. A power converter circuit according to claim 8 wherein the charge pump circuit comprises only the first and second capacitors.

10. A power converter circuit according to claim 1 wherein the charge pump circuit comprises a second capacitor connected across a diode of the supply rectifier circuit.

11. A power converter circuit according to claim 10 wherein the charge pump circuit comprises only the first and second capacitors.

12. A power converter circuit according to claim 1 comprising two or more charge pump circuits.

13. A power converter circuit according to claim 1 comprising two charge pump circuits: a first of said charge pump circuits comprising the first capacitor connected between the supply rectifier circuit and either the load rectifier circuit or the output of the inverter circuit; and a second of said charge pump circuits comprising a charge pump diode connected between the supply rectifier circuit and the inverter circuit, and a third capacitor connected between the supply rectifier circuit and either the load rectifier circuit or the output of the inverter circuit.

14. A power converter circuit according to claim 13 wherein the first charge pump circuit comprises only the first and second capacitors, and the second charge pump circuit comprises only one charge pump diode and the third capacitor.

15. A power converter circuit according to claim 13 wherein the second of said charge pump circuits comprises a fourth capacitor connected in parallel with the charge pump diode.

16. A power converter circuit according to claim 1 comprising one or more additional charge pump circuits, each said additional charge pump circuit comprising a charge pump diode and one or more additional capacitors, wherein the charge pump diode is connected to another diode.

17. A power converter circuit according to claim 16 wherein each additional charge pump circuit comprises only one charge pump diode and only one or only two capacitors.

18. A power converter circuit according to claim 1 comprising one or more switched charge pump circuits, each having: a charge pump capacitor connected between the supply rectifier circuit and either the load rectifier circuit or the output of the inverter circuit; and a charge pump switch connected in parallel with the charge pump capacitor; a state of the charge pump switch being responsive to a sensed circuit parameter.

19. A power converter circuit according to claim 1 wherein the inverter circuit comprises two switches connected in series, and the power converter circuit comprises an inductive element connected between the inverter circuit and the supply rectifier circuit.

20. A power converter circuit according to claim 19 wherein the inductive element has an inductive output connected to the load rectifier circuit, or connected to a first side of a transformer with the load rectifier circuit connected to a second side of the transformer.

21. A power converter circuit according to claim 1 comprising a transformer, a first side of the transformer connected between the inverter circuit and the supply rectifier circuit, and a second side of the transformer connected to the load rectifier circuit.

22. A controller for a power converter circuit according to claim 1.

23. A driver circuit for driving a lighting apparatus, the driver circuit comprising a power converter circuit according to claim 1.

24. A method of converting an AC supply power, the method comprising:
rectifying the AC supply power to generate a rectified supply power;
inverting the rectified supply power to generate an inverted supply power;
rectifying the inverted supply power to generate a rectified load power for supplying a load current to a load; and
using the load current to pump additional charge to the rectified supply power by connecting a first capacitor between the AC supply power and either the inverted supply power or the rectified load power.

* * * * *